United States Patent [19]

Bonvallat

[11] Patent Number: 5,515,436
[45] Date of Patent: May 7, 1996

[54] MODULE FOR RAPID INTERCONNECTION OF TWO MONOPAIR TELEPHONE LINES

[75] Inventor: Pierre Bonvallat, Cluses, France

[73] Assignee: Pouyet International, France

[21] Appl. No.: 271,671

[22] Filed: Jul. 7, 1994

[30] Foreign Application Priority Data

Aug. 4, 1993 [FR] France ................................ 93 09795

[51] Int. Cl.⁶ ............................. H02H 3/20; H01R 4/24
[52] U.S. Cl. .................. 379/412; 361/119; 361/824; 439/395; 439/712
[58] Field of Search ......................... 379/399, 397, 379/412, 413, 395, 404, 709; 361/103, 119, 120, 728, 733, 823, 824, 826; 439/395, 404, 709, 711, 712

[56] References Cited

U.S. PATENT DOCUMENTS

| | | | |
|---|---|---|---|
| 4,159,500 | 6/1979 | Baumbach et al. | 379/412 |
| 4,614,396 | 9/1986 | Saligny | 439/395 |
| 4,729,064 | 3/1988 | Singer, Jr. | 361/824 X |
| 4,758,920 | 7/1988 | McCartney | 361/119 |
| 4,767,654 | 8/1988 | Saligny | 439/413 |
| 4,882,748 | 11/1989 | Meyerhoefer | 379/412 X |
| 5,131,863 | 7/1992 | Gerke et al. | 439/395 |
| 5,224,881 | 7/1993 | Lejuste et al. | 439/709 |
| 5,317,474 | 5/1994 | Capper et al. | 361/119 |
| 5,358,430 | 10/1994 | Bonvallat et al. | 439/676 |
| 5,368,501 | 11/1994 | Asbell | 439/418 |
| 5,371,648 | 12/1994 | Bonvallat | 361/119 |

FOREIGN PATENT DOCUMENTS

| | | | |
|---|---|---|---|
| 2662042 | 11/1991 | France | 379/412 |
| 2661283 | 7/1992 | France | H01R 4/26 |

*Primary Examiner*—Jeffery Hofsass
*Assistant Examiner*—Scott L. Weaver
*Attorney, Agent, or Firm*—Parkhurst, Wendel & Burr

[57] ABSTRACT

This invention relates to a module for rapid interconnection of two monopair telephone lines by metal contacts with self-stripping slots. It comprises a base element which is fixed on the receiving metal rail, and which ensures connection of the incoming strands, an intermediate element which contains the major part of the connections for linkage, an upper element with master screw which ensures connection of the outgoing strands, and a fourth plug-in penta-pole element which forms a receptacle for an electrical circuit. The electrical circuit maintains electrical continuity, but may also, for example, receive an overvoltage arrester and possibly other additional components.

8 Claims, 7 Drawing Sheets

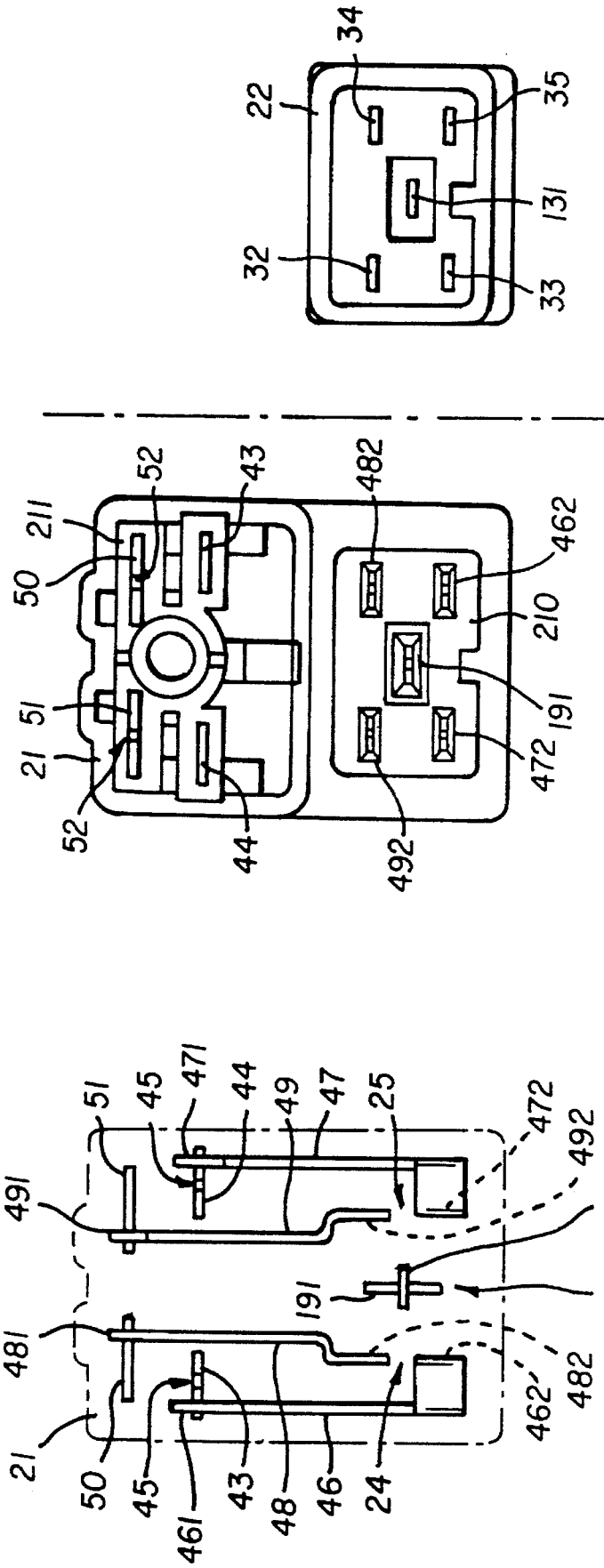

MODULE FOR RAPID INTERCONNECTION OF TWO MONOPAIR TELEPHONE LINES

FIELD OF THE INVENTION

The present invention relates to a module for rapid interconnection, typically between the telephone network and a subscriber, of two monopair telephone lines, this module presenting characteristics of tightness which enable it to be installed out of doors, for example in an aerial circuit.

BACKGROUND OF THE INVENTION

Modules of this type are at present widely marketed by Applicants under reference "MX . . . ", and are therefore well known. Furthermore, they are largely described in documents U.S. Pat. No. 4,644,396 and FR-A-2 661 283. They are based on the use of self-stripping tubular plugs, consequently split at at least one of their two ends. In that case it suffices to possess a screwdriver to make the connections.

A self-stripping tubular split plug is an extremely rigid element. If it is used with a wire whose core is made of steel, this steel core deforms the slot of the plug, enlarging it in order to be able to penetrate therein. It is then impossible subsequently to introduce wires whose core is of a smaller diameter, as they would float inside the slot.

Furthermore, several types of modules are provided at the present time, depending in particular on whether or not it is question of a module for protection against overvoltages, which is fairly penalizing as far as the manufacturing, storage and management costs are concerned.

It is an object of the invention to propose a module which is more practical, more universal and tighter than the modules mentioned above and presently marketed by Applicants.

SUMMARY OF THE INVENTION

To that end, this invention relates to a module or the rapid interconnection of two monopair telephone lines, typically for the interconnection of a monopair line of the telephone network with a subscriber's monopair line, characterized in that it is constituted by four elements adapted to be assembled on a metal rail for support and grounding, namely:

a first element, or base element for connection of the incoming line, which is fixed on this metal rail for example by clipping, and which at least comprises two channels for introduction of the two wires of the incoming line, typically that of the telephone network, means further being provided to connect to the metal rail a metal contact for grounding which traverses this base element;

a second element, or intermediate element, which covers the first element and which contains the major part of the connections for linkage between these two telephone lines, these connections being in the form of rigid or semi-rigid metal pieces, such as blades, tuning-fork contacts and self-stripping contacts, which are fitted in this intermediate element, a discontinuity for electrical linkage being, however, made therein for each of the two line links, and these connections necessarily comprising, on the one hand, two metal contacts each with at least one self-stripping slot which are prominent in the direction of the metal rail so as to receive, in self-stripping connection action, the two said wires of the incoming line previously introduced in said channels of said base element, and necessarily comprising, on the other hand, two other metal contacts each with at least one self-stripping slot which are, a contrario, prominent in the direction opposite the metal rail so as to be able to receive, in self-stripping connection action, the two wires of the outgoing line, typically the subscriber's line, which are to be connected to the two respective wires of said incoming line;

a third element, or upper element for connection of the outgoing line, which is constituted, as an upper half-bush for rapid, self-stripping connection of a monopair line, and which is therefore provided with two parallel channels for receiving and guiding the two strands of line to be connected, this third element covering a first part of the second element by mounting, in cooperation with self-stripping connection action, said other two self-stripping metal contacts, and this third element being traversed by a screw, median and perpendicular to the metal rail, which also completely traverses the second element as well as at least a part of the first element to screw in a nut or tapping, in that case forcing the said three elements to come together and consequently ensuring, the self-stripping connection of the four line strands;

and a fourth element which covers, by fitting, the remaining part of the second element, thus being positioned side by side with the third element and substantially at the same level as the latter, this fourth element thus fitting by five terminals for electrical connection, of which one terminal for linkage to said metal grounding contact which itself traverses the first and the second element, and of which two other pairs of terminals which are respectively connected, for example by connection on tuning fork contacts, to each respective side of said two discontinuities for electrical linkage which are provided in the second element, and this fourth element forming receptacle for an electric circuit which is connected on these five terminals and which at the minimum ensures the two missing electrical linkages, by reason of said discontinuities, in the connections contained in the second element.

BRIEF DESCRIPTION OF THE DRAWINGS

The invention will be more readily understood and other characteristics will appear from the following description of a non-limiting embodiment of this rapid interconnection module, with reference to the accompanying schematic drawings, in which:

FIG. 8 is a view from the rear of the intermediate element, on which only the metal contacts and blades are visible.

FIG. 9A is, on the contrary, a view from the front of this same intermediate element.

FIG. 9B is a view similar to FIG. 9A, but in a view from the rear of the fourth element of the module.

DESCRIPTION OF PREFERRED EMBODIMENTS

Figure 1:
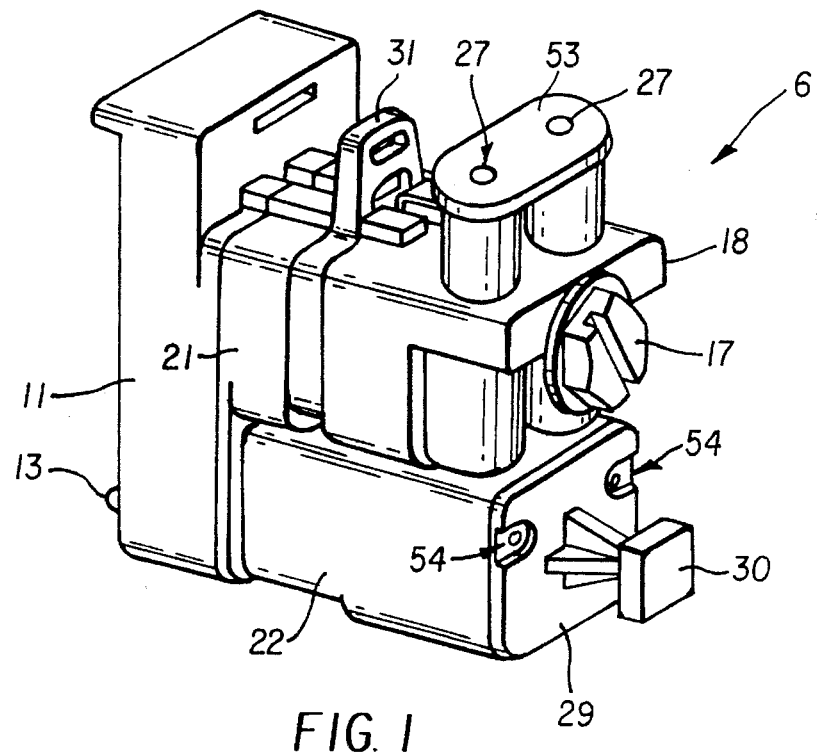
FIG. 1 is an overall view, in perspective, of the module as delivered to the customer before any connection.
Figure 2:
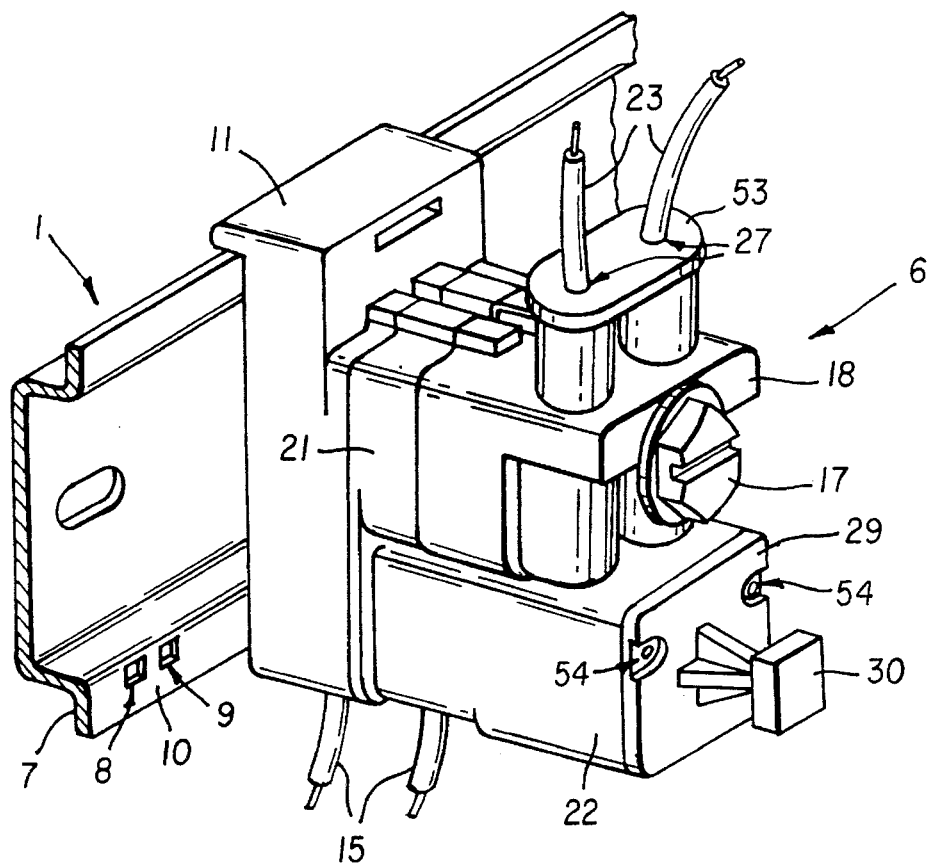
FIG. 2 shows this same module after assembly on its metal receiving rail and connection of the two pairs of wires.
Figure 3:
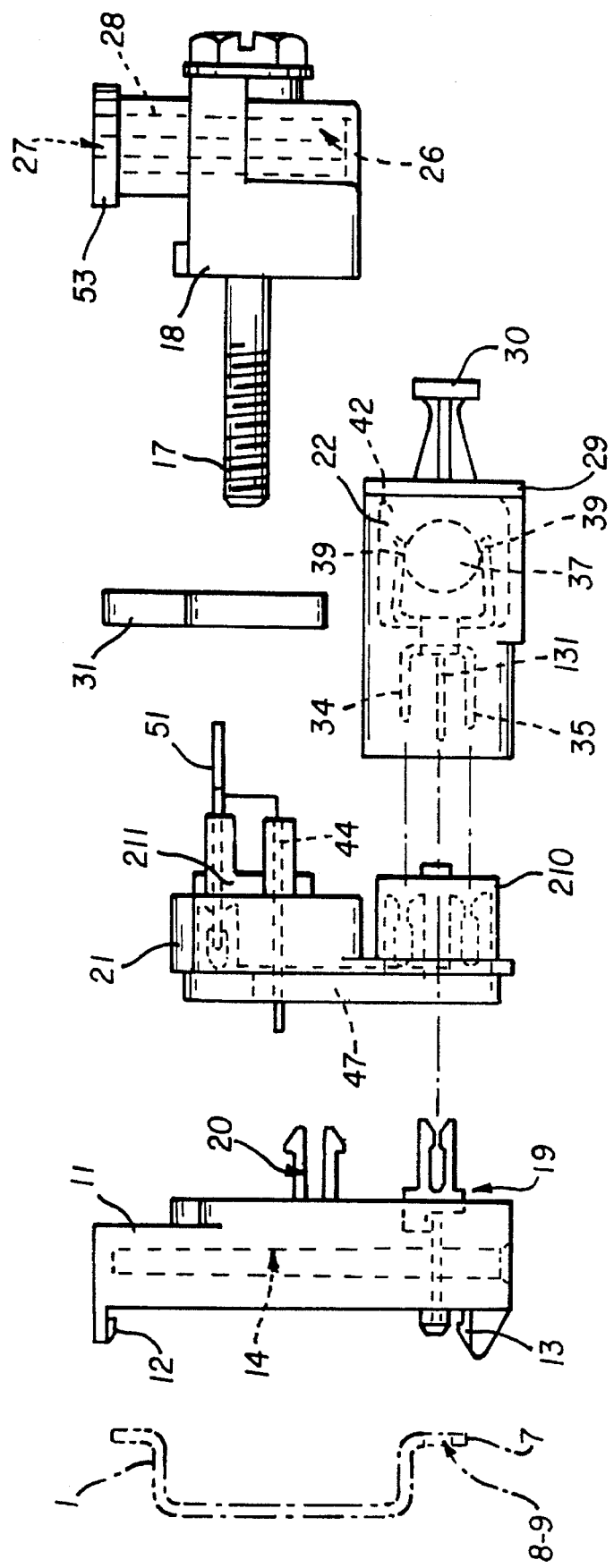
FIG. 3 is an exploded side view of the module of FIG. 1.

Referring now to the drawings, and firstly to FIGS. 1 to 6, a module 6 for rapid interconnection of telephone lines is provided. The module 6 is somewhat similar to those described in U.S. Pat. No. 4,614,396 mentioned above and which are now largely marketed under general reference "MX . . . ".

The module 6 is composed of four elements 11, 21, 18, 22 which are mechanically assembled and cooperate from the standpoint of connections, and it is designed to be mounted on a metal rail 1, of the "DIN rail" type, of which one of the two longitudinal flanges 7 is pierced with pairs of adjacent slots 8, 9 which define therebetween a narrow metal band 10, this assembly 8, 9, 10 being provided to receive a tuning fork contact for grounding the module 6 which, as will be seen in greater detail hereinafter, is mounted on the narrow band 10.

A first element of the module 6 is its base element 11 which is provided to be fixed on the metal rail 1 by clipping, thanks to hooks 12, 13.

This base element 11, which may also be called lower ring by analogy with the known devices, is made of moulded plastics material, as is the whole body of module 6.

Perpendicularly to the longitudinal direction of the rail 1 and over virtually the whole of its length, there are pierced two blind channels 14 (FIGS. 3, 5 and 6) which are dimensioned to receive the two wires or strands 15 of the incoming monopair telephone line, i.e. in general the telephone network line. These strands 15 are visible in FIGS. 2 and 6.

Lower element 11 imprisons a nut 16 (FIG. 4) which receives the threaded end of the median master screw 17. Upon screwing in this nut 16, at least the lower element 11 and the upper element 18 of the module 6 move together, which, as will be explained again for this module hereinafter, conventionally ensures the self-stripping connection of the two pairs of wires to be interconnected, without it being necessary to use something other than a simple screwdriver.

Element 11 is traversed by a first half of a double tuning-fork contact 19 (cf. also FIG. 10) which is provided to mount the corresponding band or strip 10 of the rail 1 and thus ensure a ground connection.

Finally, a double hook 20 made of plastics material, moulded with the body of element 11, is fixed by clipping in the body, provided to that end, of the second element 21 of the module 6, thus solidly connecting these two elements 11 and 21.

The purpose of this latter element 21, or intermediate ring, is to ensure linkage connections between the base element 11, on the one hand, and the last two elements 18 and 22 of the module 6, on the other hand. It is in the form of a body of moulded plastics material in which are formed housings for metal connections which, as will be explained hereinafter with reference likewise to FIGS. 8 and 9A, and especially 10, is in the form of an assembly of rigid or semi-rigid metal strips and tuning-fork contacts, or, in other words, in the form of cut-out metallic circuits.

It should be indicated at this stage that the purpose of these cut-out circuit connections is at least electrically to connect, within the module 6, the two pairs 15 and 23 of strands of line to be interconnected. A particular feature of these connections is that they present, for each strand, a point 24, 25 (FIG. 8) of interruption, in this intermediate element 21, of the electrical circuit for interconnection between an incoming strand 15 and the corresponding outgoing strand 23. It is in this fourth element 22 that the two staples are located which, when this element 22 is fitted on element 21, then ensure electrical continuity by short-circuiting the free spaces 24 and 25 respectively.

The third element 18, or upper ring, calls for fewer comments since, as a whole, it is question of an upper half-bush for connection of the two outgoing wires or strands 23, typically towards a subscriber's telephone installation, which is Fairly similar to those described in the two documents U.S. Pat. No. 4,614,396 and FR-A-2 661 283 mentioned above.

It is therefore traversed, in captive manner, by the master screw 17 which serves to force elements 11 and 18 to move together and consequently to effect the self-stripping connections of the two pairs of strands 15 and 23. Two blind channels 26, parallel to each other and parallel to channels 14, conventionally receive the two outgoing strands 23.

However, these receiver channels 26 present an interesting particular feature. As shown, in fact, in FIGS. 6 and 7, the inner part of these channels is provided over a small half of its length and at least towards the orifice 27 for introduction of the wire 23, longitudinal fins 28 which are made by moulding.

It should be mentioned at this stage that these outgoing channels 26 are intended to be filled, like all the module 6, with a self-closing sealing gel, such as a silicone gel of this type. It is thus possible to withdraw the outgoing strands 23 several times to make repairs or changes, possibly replacing them by other strands, without loss of seal thanks to the self-closing nature of the gel used.

The purpose of the fins 28 is to increase the surface of adherence of the gel against the inner wall of the channel 26 and consequently to oppose to a maximum the extraction of this gel when the wire 23 is withdrawn. Of course, the fact that the inlet orifices 27 are of much smaller diameter than channel 26, by reason of the addition of a stopper 53, reinforces this effect.

Furthermore, a fourth element 22 is provided, of which the body, likewise made of moulded plastics material, forms a hollow receptacle which is closed by a welded lid 29, itself provided with a head 30 for gripping this element 22. This lid 29 is pierced with two orifices 54 which enable a line test to be made.

Element 22 is fitted on a conjugate part 210 of the intermediate element 21, whilst element 18 covers the remaining part 211 of this intermediate element 21 (cf. in particular FIG. 9A).

It should, of course, be noted that an easily removable plastic shim 31 is conventionally provided between elements 21 and 18 upon delivery of the module 6 in order to avoid tightening the screw 17 completely before having previously introduced the incoming wires 15 in module 6.

As is seen in particular in FIGS. 9A and 9B, the base of element 22 comprises five metal terminals of which a central terminal 131 and two pairs of lateral terminals 32, 33 and 34, 35 respectively, which are provided to fit in five respective receiver tuning-fork contacts 191, 482, 462, 492, 472 of half 210 of the intermediate element 21.

These five terminals 131, 32 to 35 and their five receiver tuning-fork contacts mentioned above are also clearly visible in the exploded view shown in FIG. 10, to which reference will now be made for a more detailed description of the inner connections of this module 6, this description being made in particular in close liaison with FIG. 8 which is a view from the rear of the metal connections imprisoned in module 21, its plastic body not being shown in order to facilitate comprehension.

These inner connections comprise:

The double ground tuning-fork 19 mentioned above, which comprises a lower tuning-fork 190 which mounts the receiving strip 10 of rail 1 (FIGS. 2 and 5), and an upper coaxial tuning-fork 191, turned angularly through 90 degrees with respect to the tuning-fork 190, which receives the central terminal 131 of the fourth element 22.

This central terminal 131 which constitutes a ground point.

Figure 4:
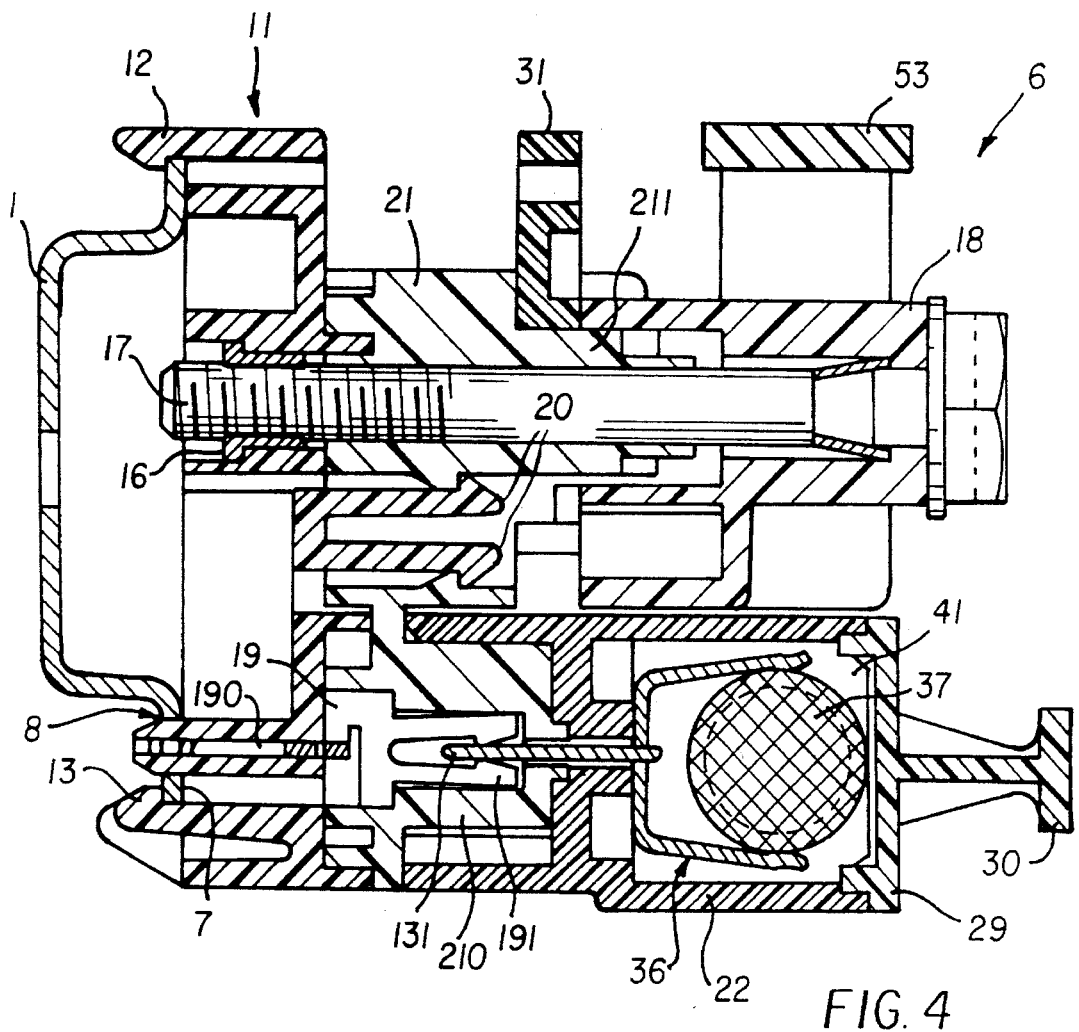
FIG. 4 is a vertical and median longitudinal section of the module of FIG. 1, mounted, however, on its receiving rail.
Figure 5:
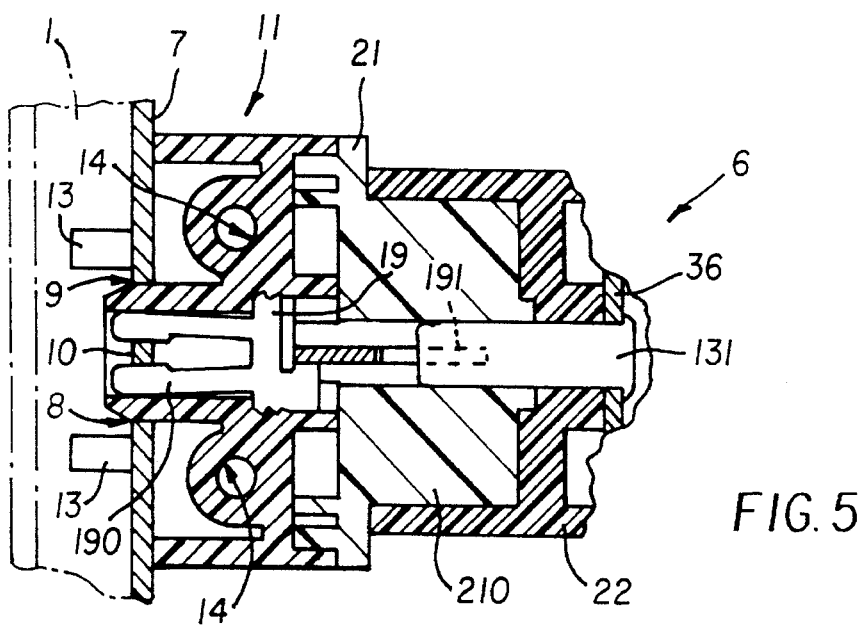
FIG. 5 is a partial horizontal section showing the detail of the ground connection of this module on its metal receiving rail.
Figure 6:
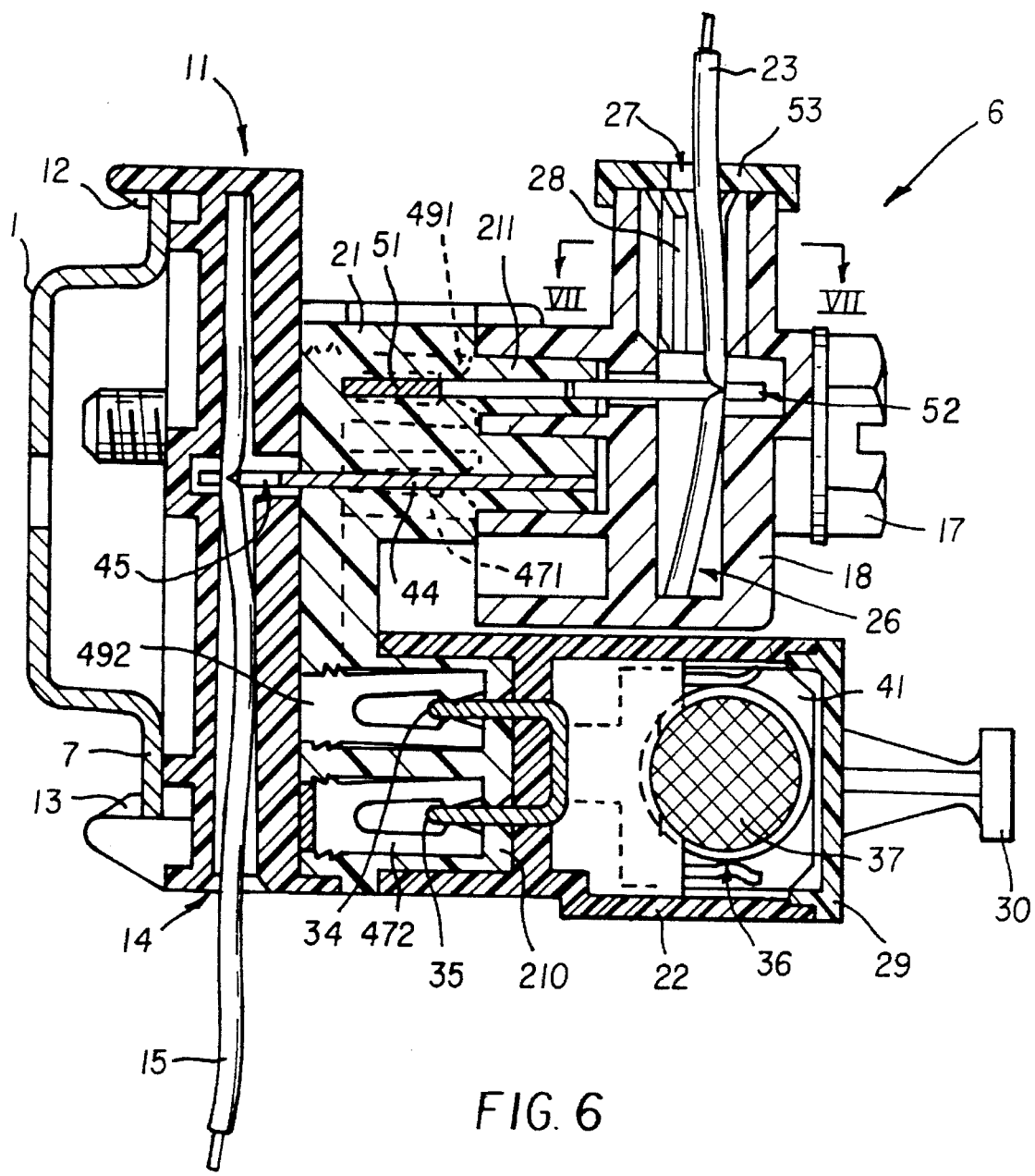
FIG. 6 is a longitudinal and vertical section of the module of FIG. 2, made at the level of two conjugate receiver channels for two strands to be interconnected to each other.
Figure 7:
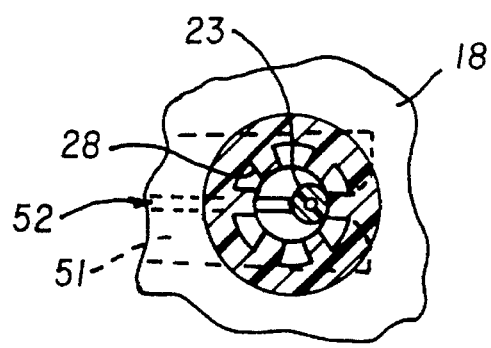
FIG. 7 is a small detailed view in section, made along VII—VII of FIG. 6.
Figure 10:
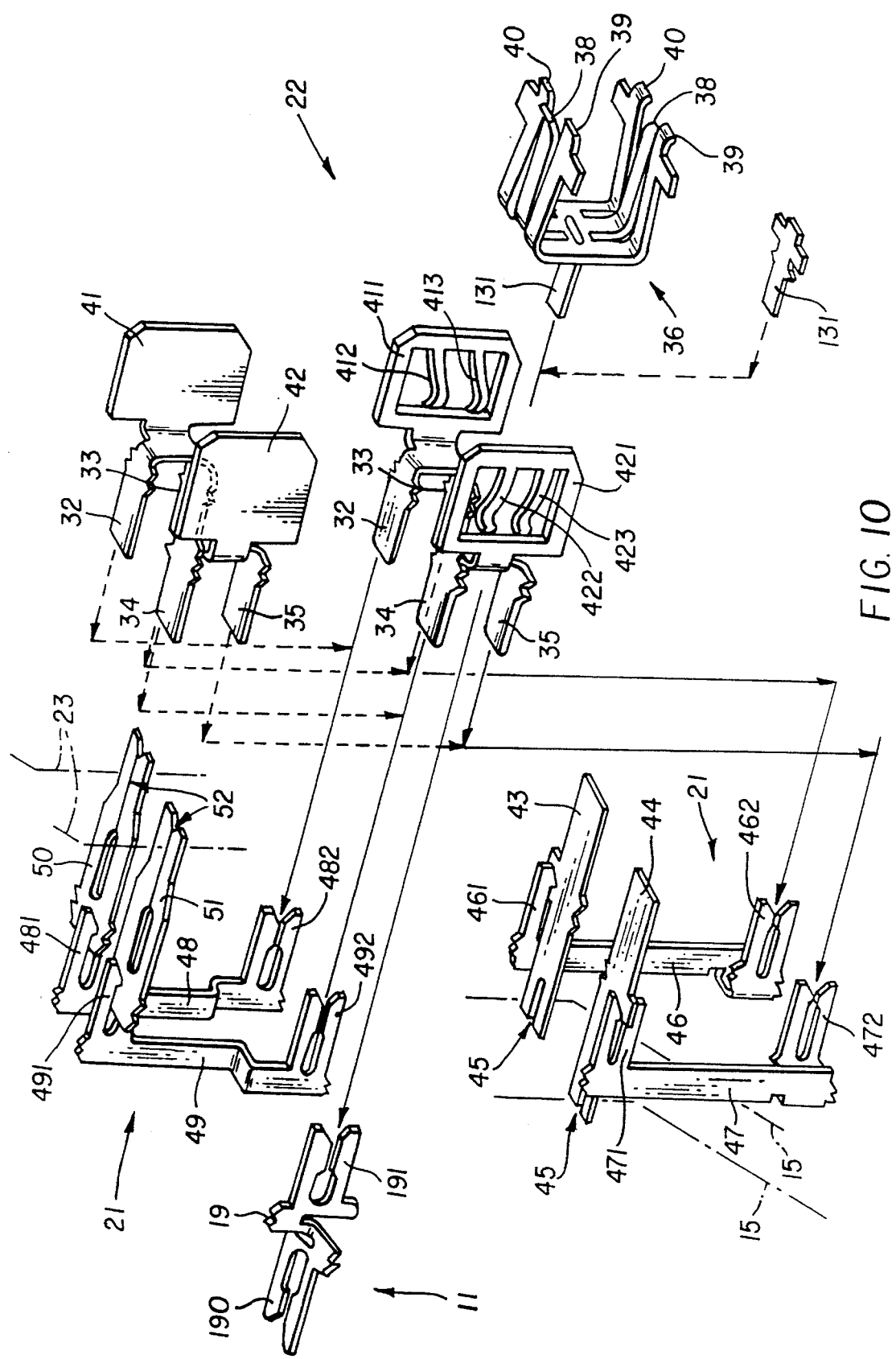
FIG. 10 is an exploded structural perspective view of the various metal elements forming all the connections that this module contains, and in accordance with two embodiments of its fourth element.

In a first of the two cases shown in FIG. 10, this ground terminal 131 is left unconnected and is therefore not used, except as stopper. In that case, where element 22 serves only to ensure line continuity, its central orifice may, moreover, be stopped. In the second case, it forms part of a cradle 36 for receiving a three-pole overvoltage arrester 37 (FIGS. 4 and 6). The receptacle constituted by the inner part of element 22 is in that case a receptacle for receiving a three-pole overvoltage arrester such as the one described in great detail in French Patent Application No. 93.05049 filed by Applicants on 23rd Apr. 1993 and entitled: "Plug-in protection module for a module for rapid interconnection of telephone lines". The cradle 36 is consequently a cradle with three pairs of arms, viz. a median pair 38 which receives the median ground electrode of the overvoltage arrester 37 and two lateral pairs 39 and 40 which press against a thermofusible shim (not shown) which overlaps the body of the overvoltage arrester 37.

The two pairs of lateral terminals mentioned above, 32, 33 and 34, 35 respectively, of element 22.

In the first case mentioned (terminal 131 left in the free air), terminals 32 and 33 simply form a metal staple for continuity, and they are made in one piece with a metal plate 41 whose only use is to maintain them mechanically in the inner part, forming receptacle, of element 22, and to allow access to the line to make a test thereof through the two orifices 54 mentioned. The same applies to the other two terminals 34 and 35 which form, in one piece with another fixation plate 42, a second metal staple for continuity. In the second case mentioned (terminal 131 forming part of a cradle 36 for receiving a three-pole overvoltage arrester), the two pairs of terminals 32, 33 and 34, 35 still form a metal staple for continuity, but the two fixation plates 41 and 42 are then shaped, in order respectively to receive the two lateral line-connection dishes of overvoltage arrester 37, in the form of a frame, 411 and 421 respectively, which bears, as described in French Patent Application 93.05049 mentioned above, a couple, 412, 413 and 422, 423 respectively, of elastic contact blades adapted to abut firmly against these two respective lateral dishes of the overvoltage arrester 37.

The two lower self-stripping contacts 43, 44 intended for the two incoming line wires 15. Here, these two contacts are each in the form of a rigid metal blade which presents a self-stripping slot 45 in its lower part. It is this slot 45 which on traversing the channel 14 when the upper element 18 pushes the contacts 43, 44 down in the lower element 11 when the master screw 17 is screwed in nut 16, mounts the strand 15 very closely, thus effecting self-stripping connection thereof.

A first couple of cut-out metal blades 46, 47 which are fitted in the base of the intermediate element 21 (FIG. 8) and which extend parallel to each other and in the same direction as rail 1. Each of these blades 46, 47 includes a tuning-fork contact 461, 462 and 471, 472 respectively, at each of these ends. These four tuning-fork contacts are all directed in the same direction as tuning-fork contact 191, i.e. in the direction of the upper elements 18 and 22. The two tuning-fork contacts 461 and 471 respectively receive the two self-stripping contacts 43 and 44 as shown in FIG. 10. The two tuning-fork contacts 462 and 472 respectively receive the two terminals 33 and 35 as is likewise seen in this FIG. 10.

A second couple of cut-out metal blades 48 and 49 which are (FIG. 8) fitted in the intermediate element 21 in the respective proximity of the blades 46 and 47, and are substantially parallel thereto. As mentioned hereinbefore, the blades 48 and 49 are placed in the element 21 so as to define two spaces 24 and 25 for insulation (FIG. 8), the electrical continuity being ensured by the two staples 34-42-35 (or 34-421-35) and 32-41-33 (or 32-411-33). Consequently, there is provided a tuning-fork contact 482 and 492 respectively, at the lower end of each blade 48 and 49, i.e. at the end which is close to the corresponding tuning-fork contact, 462 and 472, of the other arm or blade 46 and 47. The tuning-fork contact 482 receives terminal 32, whilst tuning-fork contact 492 receives terminal 34, the electrical continuity in that case consequently being ensured between the blades 46 and 48 on the one hand, and 47 and 49 on the other hand. As hereinbefore, the tuning-fork contacts 482 and 492 are, of course, cut out in one piece with the respective blades 48 and 49. The other end of the blades 48 and 49 comprises, like blades 46 and 47, another tuning-fork contact 481 and 491 respectively. These tuning-fork contacts 481 and 491 receive the two self-stripping contacts 50 and 51 which are associated with the two outgoing line wires 23. These are flat contacts, like contacts 43 and 44. However, they differ in that they are shaped so that their self-stripping slot 52 is not strictly rigid, as is the case for all the heretofore known self-stripping contacts, but, on the contary, presents a sufficient semi-rigidity in order to be able to move apart under the action of the metal core of the wire 23 which is introduced therein. However, the rigidity is determined sufficient for such introduction to provoke cutting of the sheath of this wire, i.e. its self-stripping. As a result, this module may receive subscriber wires 23 of various calibers, of which the core is made equally well of a hard metal such as steel or a ductile metal such as copper. This was not possible with the prior-art self-stripping contacts, as the introduction of a steel wire in the self-stripping slot of one of these conventional contacts resulted in enlarging said Blot: it was then no longer possible to introduce therein wires of smaller diameters.

Figure 11:
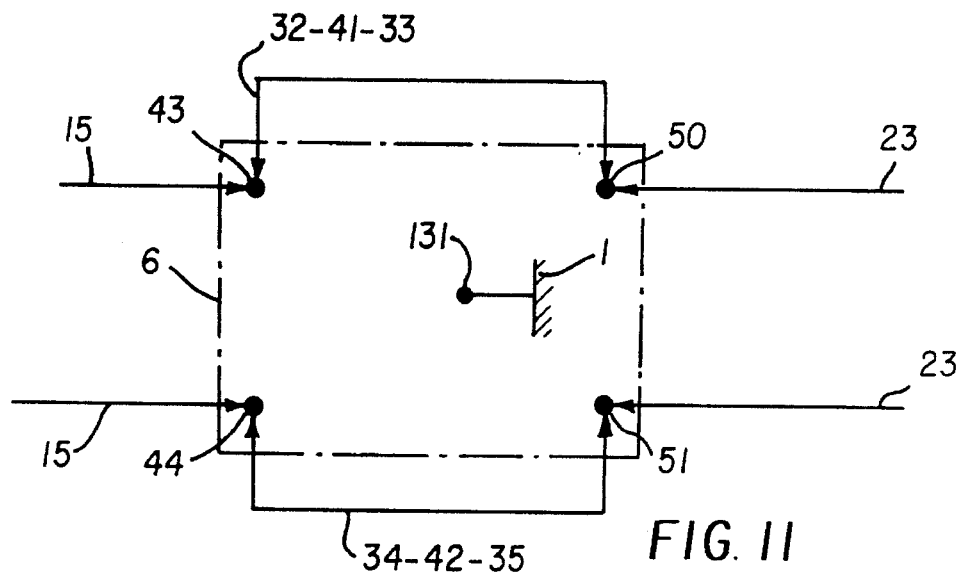
FIG. 11 is an electrical diagram of this module in the first of these two embodiments of its fourth element.

FIG. 11 is an electrical diagram of module 6 when its fourth element 22 is simply equipped with terminal. 131 alone (left "in the air" from the electrical stand-point) and staples 32-41-33 and 34-42-35 which then form simple continuity plugs.

Finally, it is observed that this module 6 forms a quadripole with two input terminals 43, 44 and two output terminals 50, 51, a ground terminal 131 being further provided, but not being used in the configuration of FIG. 11, which configuration is finally determined by the constitution of the fourth, plug-in element 22.

Figure 12:
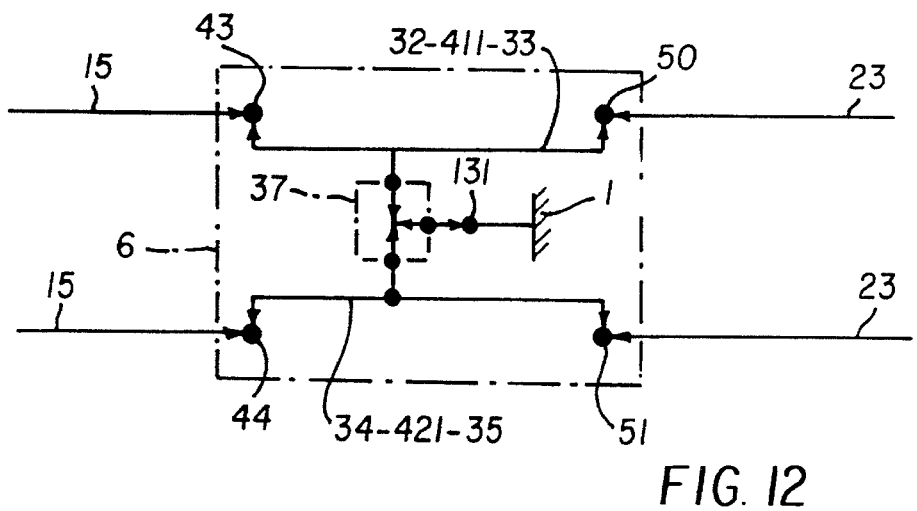
FIG. 12 is an electrical diagram of this module in the second of these two embodiments of its fourth element.

FIG. 12 is an electrical diagram of module 6 when it receives a fourth element 22 which is constituted as plug-in module for protection against overvoltages, including lightning strikes. It then contains the ground cradle 36 mentioned above, as well as the staples 32-411-33 and 34-421-35 (cf. FIG. 10), and is adapted to receive an overvoltage arrester 37, like the protection module described in French Application No. 93.05049 mentioned above.

The fourth element 22 then forms both element of electrical continuity, as in FIG. 11, and module for protection against overvoltages, as is clearly shown in FIG. 12.

Figure 13:
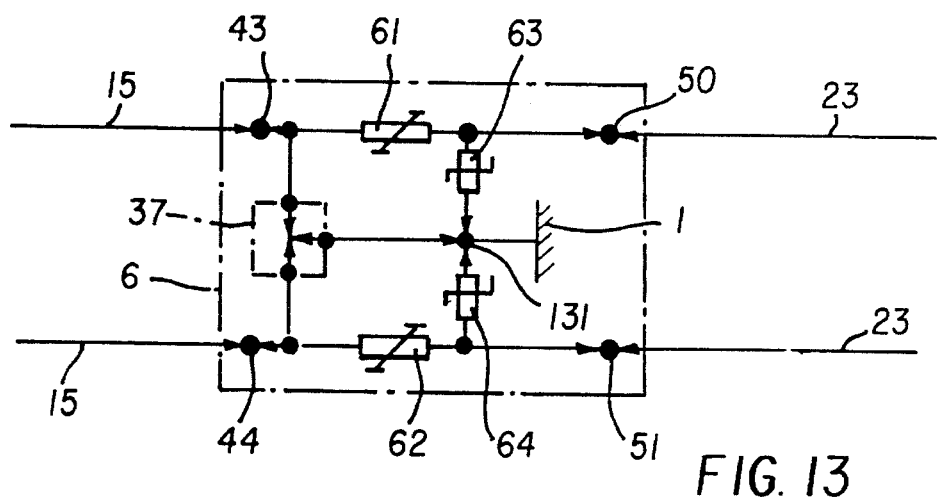
FIG. 13 is an electrical diagram of this module in a third embodiment (not shown structurally here) of its fourth element.

The fact that this module presents five points of access (43, 44, 50, 51, 131) makes it possible to design plug-in elements 22 containing all sorts of additional circuits, of which another possible example is given in FIG. 13.

The circuit of this FIG. 13 differs from that of FIG. 12 in that, on each line strand 15–23, there is further provided, on the one hand, a Positive Temperature Coefficient (or PTC) resistor 61 and 62 respectively, which is connected in series on this line strand and, on the other hand, a varistor 63 and 64 respectively, which is connected between the downstream terminal, or 50 and 51 respectively, of each PTC resistor 61, 62, and ground. Thanks to the overvoltage arrester 37, not only a protection is provided against high overvoltages, but also, thanks to the PTC resistors 61, 62 and varistors 63, 64, protection against the lower overvoltages which are insufficient to trigger off the overvoltage arrester 37.

This may be very useful in countries where the mains supply voltage is still 110 volts, therefore very close to the telephone ringing voltage. An overvoltage arrester 37 must then be chosen which triggers off for a voltage clearly higher than 110 volts, in order to avoid it triggering off whenever the telephone rings. The PTC resistors and varistors 61 to 64 then serve as safety members in the event of accidental overvoltage created by a contact between a telephone line wire and a mains wire at 110 volts.

It goes without saying that the invention is not limited to the examples which have just been described, and in particular, other circuits inside the plug-in element 22 may be envisaged.

What is claimed is:

1. A module for interconnecting a telephone incoming line to a telephone outgoing line, comprising:

a base element including fastening means for fastening the base element onto a metal grounding rail, two channels for respectively receiving first and second wires of a telephone incoming line, and a grounding contact traversing the base element, said grounding contact being adapted to be electrically connected to the metal grounding rail;

an intermediate element fitted onto the base element, said grounding contact extending into the intermediate element, said intermediate element comprising (i) upper and lower portions, (ii) first and second contacts including respectively first and second self-stripping portions each having a self-stripping slot, the first and second self-stripping portions extending into the base element, and (iii) third and fourth metal contacts each including third and fourth self-stripping portions each having a self-stripping slot and extending from the upper portion of the intermediate element;

an upper element fitted onto the upper portion of the intermediate element, said third and fourth self-stripping portions extending into the upper element, said upper element including two channels for respectively receiving first and second wires of a telephone outgoing line, and a screw extending the upper element into said intermediate element, whereby tightening the screw forces said first and second wires of the telephone outgoing line against the third and fourth self-stripping portions, and biases the first and second self-stripping portions against the first and second wires of the telephone incoming line; and a lower element fitted onto the lower portion of the intermediate element, said lower element including a first terminal and first and second pairs of terminals, said first terminal being electrically connected to the grounding contact which extends into the intermediate element, said first pair of terminals electrically interconnecting the first contact to the third contact of the intermediate element, said second pair of terminals electrically interconnecting the second contact to the fourth contact of the intermediate element.

2. The module of claim 1, wherein each of the first, second, third and fourth metal contacts further includes a tuning fork clip which receives a respective terminal of the first and second pairs of terminals.

3. The module of claim 1, wherein said grounding contact includes a first tuning clip which receives said first terminal, and a second tuning clip which for clipping onto the metal grounding rail.

4. The module of claim 1, wherein each of the self-stripping portions comprises a blade having the respective self-stripping slot formed therein.

5. The module of claim 4, wherein each of the blades has an elastic property such that each respective self-stripping slot widens to receive each respective wire.

6. The module of claim 1, wherein the lower element includes an overvoltage arrester.

7. The module of claim 1, wherein the lower element includes a overvoltage protection circuit including at least one positive temperature coefficient resistor in series respectively between the first and second pairs of terminals.

8. The module of claim 1, wherein the two channels of the upper element each includes fins for retention of a self-closing sealing gel.

* * * * *